Dec. 9, 1952 A. KASIMIR 2,621,054
CHUCK
Filed July 25, 1947
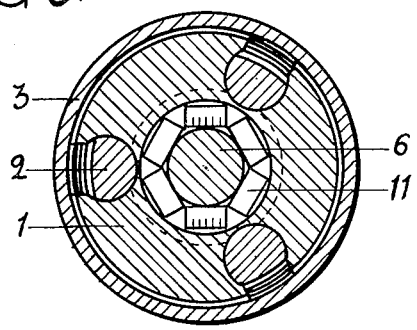
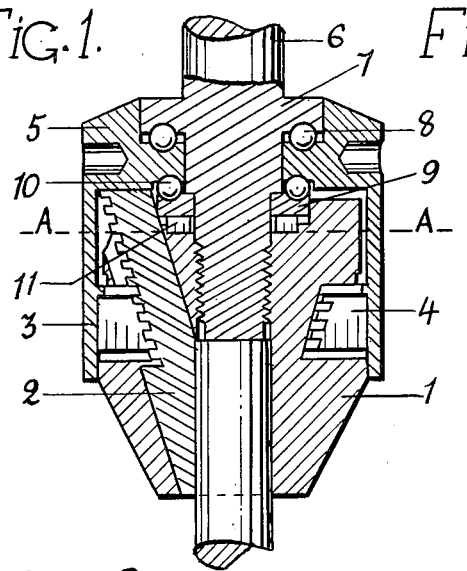
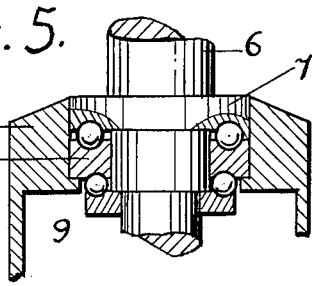
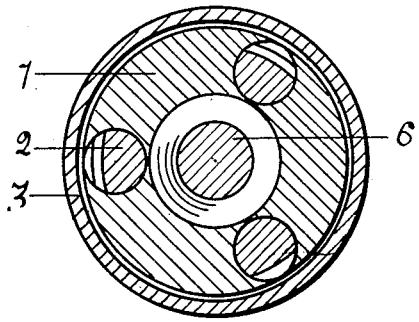
Alfred Kasimir
Inventor.

Patented Dec. 9, 1952

2,621,054

UNITED STATES PATENT OFFICE 2,621,054

CHUCK

Alfred Kasimir, Stangby, Sweden

Application July 25, 1947, Serial No. 763,697
In Sweden August 17, 1946

4 Claims. (Cl. 279—61)

The present invention relates to chucks, or tool holders comprising a body member which is screwed or otherwise fixed to the driving shaft, three or more endwise sliding gripper jaws arranged in downwardly converging guide passages on the body member, the said jaws having the outer surfaces of the ends that are opposite to the gripper ends screw threaded, a nut engaging the screw threads of the sliding jaws in order to move them longitudinally to grip and release the tool, a sleeve surrounding the nut and body member and being connected to the nut.

In these chucks to-day the friction is great on the surface in the groove where the nut is placed, and for this reason the nut or sleeve has been provided with bevel teeth for rotating it.

The object of this invention is to reduce the friction in order to dispense with the bevel teeth.

The arrangement that forms this invention is an annular flange provided on the sleeve and extending inwardly over the end of the body member into the shaft, another annular flange in one piece with or connected to the shaft of the chuck and extending over the said sleeve flange, ballbearings or the like on one or both sides of the sleeve flange. Said arrangement has for its purpose to determine the position of the flange, sleeve and nut.

An embodiment of the invention is shown in the appended sheet of drawings. Fig. 1 is a sectional side view of a chuck. Fig. 2 is the under cross section face on line A—A of Fig. 1. Fig. 3 is the over cross section face on line A—A of Fig. 1. Figs. 4 and 5 show details in section.

In the construction illustrated the chuck comprises a body member 1 having therein three guide passages arranged in converging relationship to one another and to a common centre line. Gripper jaws 2 are located in said guide passages, and the outer surfaces of the ends opposite to the gripper ends are screw threaded. A nut 4 located in an annular groove in the body member engages with the threads on the jaws in order to move them endwise, said nut is firmly connected with the surrounding sleeve 3, which loosely surrounds also the body member. The sleeve is firmly provided with an annular flange 5 extending inwards over the end of the body member at shaft end. A shaft 6 is screwed into the body member and has an annular flange 7 that extends partly over said sleeve flange 5, and between the both flanges is arranged a ballbearing 8. At the end of the body member under the sleeve flange 5 is located a bearing ring 9, and between it and the sleeve flange 5 is arranged a ball race 10. When the nut 4 is driven into the sleeve 3 the nut must be pressed against the under wall of the groove in the body member, but in function the nut is not permitted to contact said wall. The body member must accordingly be extended in length, and this is realized by interjacent bits 11 put in between the ring 9 and the end of the body member through the opening for the shaft 6, and a shoulder on the shaft presses the ring 9 and under it the interjacent bits to the body member in firm connection. The ballbearings can be arranged on one or both sides of the sleeve flange as shown in Fig. 1, but they can also be arranged on one or both sides of a ring 12 firmly fitted to the sleeve flange as is shown in Fig. 5.

In another construction the body member at the shaft end is substantially so small in diameter than the nut is permitted to drop over it to its place, and the sleeve and the nut can be in one piece or welded together. In this case the nut, when the chuck is to be assembled, is in such low position on the body member that the jaws can pass by the threads in the nut. When all the jaws have been inserted the nut and the jaws are then simultaneously moved upwardly whereby the threads of the nut and of the jaws engage, and the nut is fixed to its place in the before said manner.

The sleeve flange 5 may be in one piece with the sleeve as shown or may be screwed into it, or otherwise it may be firmly connected with the sleeve.

It will in addition be understood that the example of my invention described herein is of an illustrative character and that various changes may be made within the meaning of the following claims. Specially I will call attention to that the shaft also may be fixed into the body member in any suitable manner and that the annular flange at the shaft also may be one piece for itself having driving or loose fit on the shaft under a shoulder, and what I here above have called shaft may consist also of a part fixed to the body member and of another part attachably into a rotated head of a machine or into a holder where the work rotates, and the both said parts are connected by cones one into the other.

I claim:

1. The combination in a chuck of a body member firmly connected to a driving shaft having downwardly converging guiding passages, gripping jaws slidably mounted therein, the outer surfaces of said jaws at the ends opposite to the gripper ends being screw threaded, and at the threads the body member being reduced in diameter, a nut located in said body member and engaging with the threads of the jaws in order to move the jaws longitudinally, a sleeve surrounding the nut in firm connection therewith, said sleeve also surrounding the body member, an annular flange firmly provided on the sleeve at the end opposite to the gripper end of the chuck and extending inwardly over the end of the body member, and a bearing between the said flange and the end of the body member.

2. The combination in a chuck of a body member firmly connected to the driving shaft having downwardly converging guiding passages, jaws slidably mounted therein, the outer surfaces of said jaws at the ends opposite to the gripper ends being screw threaded, a nut engaging with the threads and located in an annular groove of greater width than itself, a sleeve surrounding the nut having driving fit therewith, said sleeve also surrounding the body member, an annular flange provided on the sleeve extending inwardly over the end of the body member and covering it and having an opening, a shaft extending through said opening and fixed to the body member, a bearing ring at the inner side of said flange, interjacent bits between said ring and the body member put in through the opening for the shaft, and a shoulder on the shaft pressing against the ring.

3. A chuck according to claim 1 wherein the said bearing is arranged inside the inner limit of the guiding passages or their extension.

4. The combination in a chuck of a body member having downwardly converging guiding passages, jaws slidably mounted therein, the outer surfaces of said jaws at the ends opposite to the gripper ends being screw threaded, and at the threads the body member being reduced in diameter, a nut located in said body member and engaging with the threads, a sleeve firmly connected to the nut and also surrounding the body member, an annular flange firmly provided on said sleeve and extending inwardly over the end of the body member, and a bearing ring firmly fitted into the sleeve flange covering the body member and having opening through which the shaft from the body member extends.

ALFRED KASIMIR.

REFERENCES CITED

The following references are of record in the file of this patent:

UNITED STATES PATENTS

| Number | Name | Date |
| --- | --- | --- |
| 911,012 | Jacobs | Jan. 26, 1909 |
| 1,042,507 | Van Ness | Oct. 29, 1912 |
| 1,476,903 | McConnell | Dec. 11, 1923 |
| 1,513,332 | McConnell | Oct. 28, 1924 |
| 1,979,652 | Taylor | Nov. 6, 1934 |

FOREIGN PATENTS

| Number | Country | Date |
| --- | --- | --- |
| 624,985 | Great Britain | June 20, 1949 |